April 10, 1962 A. SONNTAG ETAL 3,028,746
LUBRICANT TESTING MACHINE
Filed Sept. 9, 1957 3 Sheets-Sheet 1
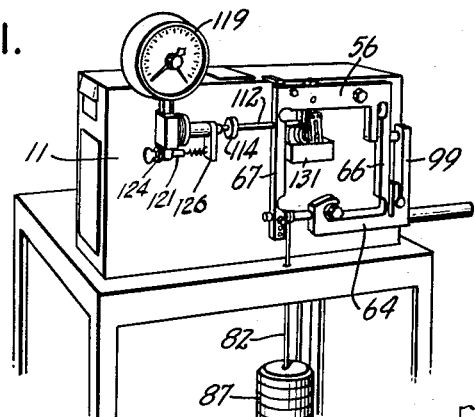
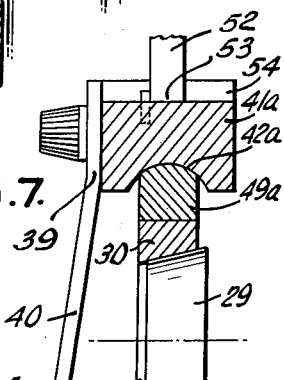
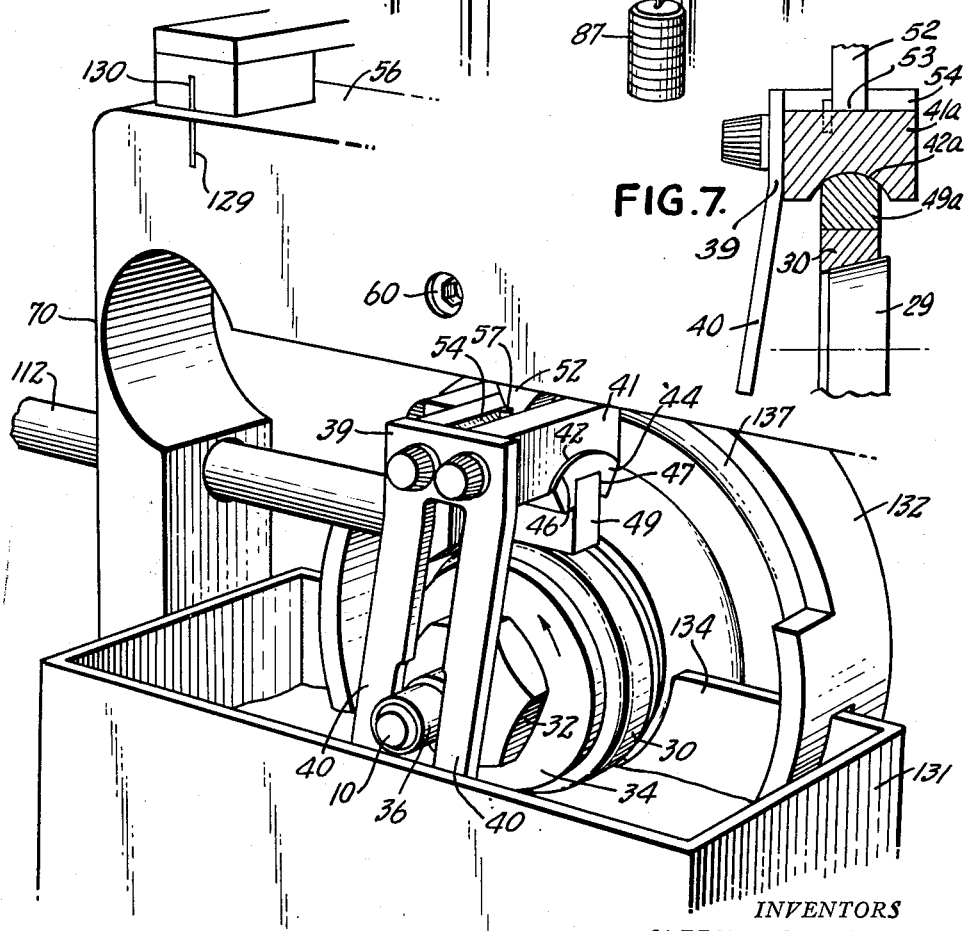
INVENTORS
ALFRED SONNTAG
BY ALBERT E. BOWEN JR.
ATTORNEYS
Curtis, Morris & Safford.

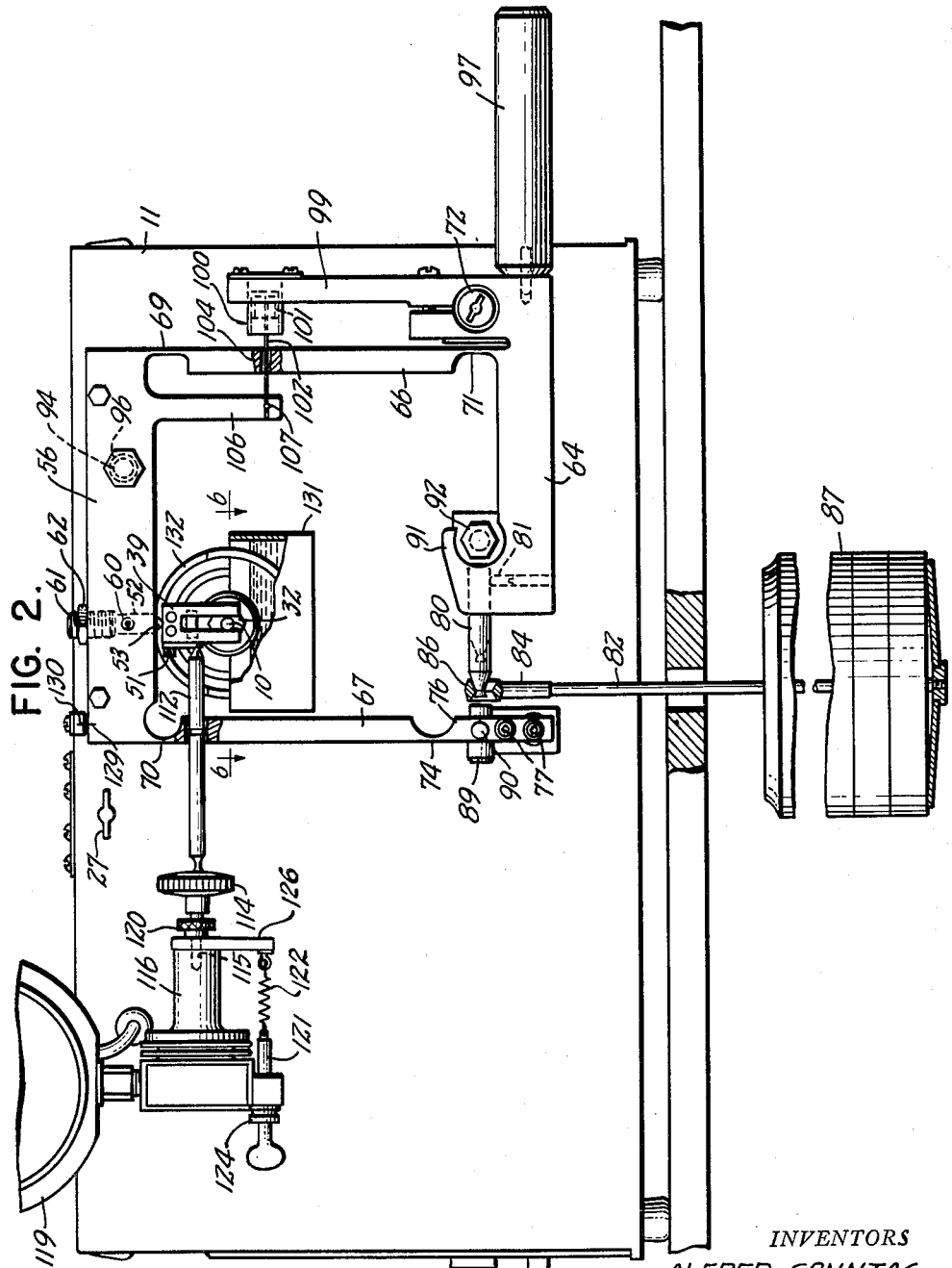

April 10, 1962   A. SONNTAG ETAL   3,028,746
LUBRICANT TESTING MACHINE
Filed Sept. 9, 1957   3 Sheets-Sheet 3
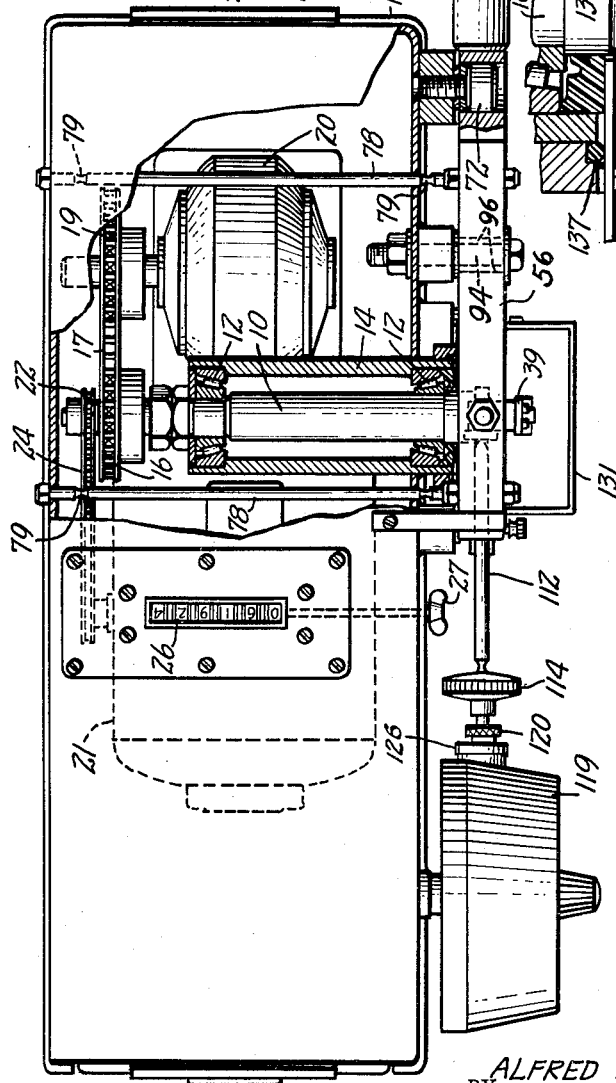
INVENTORS
ALFRED SONNTAG
ALBERT E. BOWEN JR.
BY
ATTORNEYS
Curtis, Morris & Safford.

United States Patent Office 3,028,746
Patented Apr. 10, 1962

3,028,746
LUBRICANT TESTING MACHINE
Alfred Sonntag, Greenwich, and Albert E. Bowen, Jr., Old Greenwich, Conn., assignors to The Alpha Molykote Corporation, Stamford, Conn.
Filed Sept. 9, 1957, Ser. No. 682,750
7 Claims. (Cl. 73—10)

This invention relates to a machine for measuring the friction between two relatively sliding surfaces. It is useful particularly for comparative testing of lubricants that may be solid or fluid and has among its outstanding advantages the characteristics of extreme accuracy and reproducibility of test results.

Lubricant testing machines of the type that involve measurement of frictional force between test specimens have been subject to inherent inaccuracies despite attempts to observe close tolerances in the preparation of bearings and other moving parts that transmit load to the test specimens and sense the magnitude of the frictional forces thereby generated. It is extremely important, in order to obtain accurate test results with machines of the type having a test block pressed into contact with the peripheral surface of a test ring, that the load applied to the contacting test bearing surfaces be exactly in line with the axis of rotation of the test ring and that line contact be maintained at all times between the test block and the test ring despite even minor variations in the surfaces thereof.

In accordance with the present invention, a mechanism is provided that eliminates the sources of errors inherent in prior machines and greatly facilitates lubricant testing methods. One means for accomplishing this result is that of utilizing an integral system of lever members connected to one another by flex points of reduced cross section to provide a load-applying system that is virtually free of frictional errors and is not subject to errors resulting from tolerances between adjacent bearing surfaces. Means are also provided for supporting one specimen in such a manner that it is freely capable of self-adjustment to the contour of the other test specimen so as to maintain a constant line or area of contact between them. Still another feature is that the mechanism can be adjusted accurately to maintain a preselected positional relation between the test specimens under all conditions of operation and to provide means for adjusting the mechanism so that the frictional force can be recorded directly in units of force. In addition, safety means are provided for guarding the mechanism against overloading and against shock due to handling or other causes. Finally and perhaps most important, the mechanism of the invention makes possible an accurate correlation among such factors as load, friction, speed and duration of the run, temperature generated by the friction produced or any combination of those factors.

The structural details, principles, advantages and utility of a mechanism constructed in accordance with the invention will become further apparent from the following detailed descripton of the best mode now contemplated for carrying out the invention, said description being made with reference to the accompanying drawing wherein:

FIGURE 1 is a view in perspective showing a typical testing machine placed on a suitable testing table;

FIGURE 2 is a view in elevation showing the elements in somewhat larger scale;

FIGURE 3 is a plan view with a portion of the casing cut away to show the interior;

FIGURES 4 and 5 are fragmentary views, in still greater detail, showing the assembly of parts for supporting a test block in contact with a test ring;

FIGURE 6 is a detailed cross sectional view taken on section line 6—6 of FIGURE 2; and FIGURE 7 is a detailed and fragmentary view, in cross section, of a structure alternative to that shown in FIGURES 4 and 5.

In the embodiments illustrated, a test shaft 10 which protrudes through the front of a suitable casing 11 for the machine is mounted for rotation in bearings 12 which are in turn mounted in a tube 14 welded or otherwise secured to the front of the casing 11 and to suitable ribs or supports, not shown, within the casing. An oil seal 15 is provided for the bearings 12 at the front end of the shaft, as shown best in FIGURE 6. The shaft 10 is provided at the rear or inner end thereof with a sprocket 16 driven by a chain 17 from a sprocket 19 secured to the output of a reduction gear box 20 driven by a motor 21. A second sprocket 22 on the test shaft is provided for a chain 24 that drives a revolution counter 26 resettable by a thumb screw 27, knurled knob or the like, as shown best in FIGURE 3.

The front end of test shaft 10 has a tapered portion 29 for receiving a test ring 30 and a threaded portion 31 receiving a specimen-retaining nut 32 having a ground thrust face 33 for holding the test ring 30 securely on the tapered portion 29 through the medium of a carefully ground washer 34. The forward extremity of the shaft 10 has a still further reduced diameter for receiving a bushing 36 having a shoulder portion 37, the bushing 36 being rotatable with reference to the shaft 10 and also with reference to a bifurcated retaining member 39, the arms 40 of which straddle the bushing 36, as shown best in FIGURES 4 and 6.

In the embodiment illustrated in FIGURES 4 and 5, an upper load transfer member 41 is provided with a concave cylindrical seat 42 having a center line of curvature tangential to a test ring 30 for receiving a block specimen holder 44 having a mating convex cylindrical surface 46 and a slot 47 for receiving a test block 49 and holding it against the peripheral surface of a test ring 30. The cylindrical seating of the block specimen holder in the underside of the upper load transfer member 41 permits the test block 49 to adjust itself to maintain line contact with the peripheral surface of the test ring 30 by movement about the center line of curvature, i.e., an axis tangential to the peripheral surface of test ring 30 and longitudinally perpendicular to the axis of rotation thereof.

On the left side of the load transfer member 41, as seen in FIGURE 5, a side piece 50 is secured by means of cap screws 51 or the like in order to retain a test block 49 held in the specimen holder 44 and urged toward the left upon counterclockwise rotation of the test ring 30 and to provide a means for transferring the force applied to the test block 49 by the test ring 30 to a friction measuring assembly to be described.

A load is applied between a test block 49 and a test ring 30 through the medium of the specimen holder 44 and the upper load transfer member 41 by a thrust member 52 having a knife edge 53 seated in a V-groove 54 in the upper surface of the member 41 and carried in a hole reamed vertically through an upper lever member 56. As shown in FIGURE 4, the upper load transfer member 41 is locked against movement towards the casing by a pin 57 in a suitable pin hole in the base of the groove 54 for abutment against the side of the thrust member 52. The thrust member itself is provided with a longitudinal V-groove 59, shown best in FIGURE 5, that is engageable by a cone-pointed set screw 60 in the upper lever member 56 so as to maintain an initial vertical adjustment of the position of the thrust member with reference to the upper lever member 56 and to maintain the knife edge 53 thereof parallel to the axis of test shaft 10. This position of the knife edge in the upper lever member 56 is further maintained by means of a set screw 61 abutting end-wise against the thrust member 52 and locked into position by a lock nut 62.

The alternative embodiment illustrated specifically in FIGURE 7 is similar in construction and based on essentially the same principle. In this embodiment, the test block 49a itself is provided with a convex, preferably cylindrical surface seated in a mating concave seat 42a of a member 41a. The member 41a has the combined functions of holding the test specimen and transmitting load thereto from a thrust member 52 having a knife edge 53 seated in a V-groove 54.

An integral lever system including, in addition to upper lever member 56 already referred to, a lower lever member 64 and vertical members 66 and 67, is provided to exert the force necessary on the thrust member 52 to apply the necessary load to a test block 49 or 49a. The upper lever member 56 is joined to the upper portions of members 66 and 67 at flex points 69 and 70, respectively, and the lower lever member 64 is joined to the lower portion of the vertical member 66 at flex point 71 and pivotally secured to the casing by means of a needle bearing 72 or the like. The lower end of the member 67 is joined by a flex point 74 to a portion 76 that is made fast to the machine casing 11 by any suitable means such as screws 77. Resilient support for the lever system is provided by lateral flex bars 78 having flex points 79 and made fast at one end to the rear wall of the casing 11 and at the other end to the upper lever member 56, the openings in the front of the casing through which the bars 78 pass being large enough to permit some relative motion.

In order to apply a load on the thrust member 52 and therefore on a test block, the upper lever member 56 is urged to rotate clockwise about the flex point 70 by a downward pull of the lever member 66 exerted through the flex point 69. The downward pull of lever member 66 is in turn actuated by a force tending to rotate the lower lever member 64 counterclockwise about the bearing 72. In order to apply a load to exert such a force on the lower lever member 64, the outer or left extremity thereof is provided with a longitudinally adjustable calibration pin 80 capable of being locked in a preselected position by means of a set screw 81 or the like. The outer end of the pin 80 carries a bale rod 82 through the medium of a bale pivot rod 84 having a knife edge 86. The bale rod 82 passes through a suitable hole or opening in a support for the machine and is adapted to be loaded with weights 87. It will be apparent, therefore, that when weights 87 are hung on the bale rod 82, a force is exerted on the calibration pin 80 and therefore the extremity of the lower lever member 64 tending to rotate the lower lever member 64 counterclockwise about the pivot 72. The force on the calibration pin 80 is multiplied and transmitted through flex points 71 and 69 and lever members 66 to the upper lever member 56 where it is again multiplied and transmitted to the thrust member 52 for ultimate delivery to a test block 49.

To avoid injury such as would be caused for example by accidentally knocking the bale pivot rod 84 off the end of the calibration pin 80, a safety stop 89 slideable longitudinally in the lower anchored portion 76 of the lever member 67 is provided to leave a relatively small clearance between it and the bale pivot rod 84. The safety stop 89 may be secured in position by a thumb screw 90 or the like and released when it is desired to remove the bale pivot rod 84 from the calibration pin 80.

To prevent damage to the system by undue deflection of the lower lever member 64, its outer extremity is formed in the shape of a hook, as shown at 91, surrounding with some clearance a deflection limiting bolt 92 secured in the casing 11 and a similar deflection limiting bolt 94 is secured to the casing 11 and positioned within a hole 96 of somewhat larger diameter in the upper lever member 56. If it is considered necessary or desirable to provide for zero load on the test piece when there is no load on the bale rod 82, a counterweight 97 may be made fast to a portion of the lever system, e.g., to the lower lever member 64, as shown best in FIGURE 2.

To dampen vibrations of the lever system, such as those due to stick-slip characteristics of the contacting surfaces of the test pieces, the lower lever member 64 is provided with an upright arm 99 carrying a damping cylinder 100 having mounted for reciprocal movement therein a piston 101 on a rod 102 passing through a hole 104 in the vertical lever member 66 and made fast to a depending arm 106 of the upper lever member 56 by means of a set screw 107 or the like.

It will be apparent that when a load is applied by the thrust member 52 to a test block, and a test ring with which it is in contact is rotated counterclockwise as seen in FIGURE 4, the friction between the periphery of the test ring and the line of contact of the test block will exert a force tending to move the test block to the left. To measure this force and thereby the friction between the test pieces, the side piece 50 is provided with a notch 110, the apex of which lies in a plane tangent to the peripheral surface of the test ring at the line of contact with the test block. This notch 110 receives the point 111 of a friction pin 112, the longitudinal axis of which likewise lies in the aforementioned tangential plane and in addition is centered between the front and rear sides of the test block. The pin 112 passes through a clearance hole in the vertical member 67 and has an adjusting wheel 114 made fast to it. A threaded end 115 of the pin 112 is threaded in a hydraulic cell 116 of a friction measuring device or gage indicated generally at 119. The threaded end 115 is provided with a lock nut 120 for fixing the effective length of the pin 112.

In order to record and read friction loads directly and accurately on the gage 119, means are provided to adjust the lever mechanism to a zero deflection position, i.e., a position in which the longitudinal axis of the thrust member 52 is perpendicular to the axis of friction pin 112 and intersects the axis of shaft 10, and to adjust the reading of the gage 119 to zero when no friction force is transmitted to the pin 112, i.e., when the shaft 10 is stationary. These means include a thumb screw 121 operable by actuation of an adjusting nut 124 to increase or decrease the tension on a spring 122 made fast to a bracket 126 on the hydraulic cell 116 and a pair of reference markers 129 and 130, marker 129 being fast to the upper lever member 56 and marker 130 being fast to the casing 11.

For initial adjustment of the mechanism, the adjusting nut 124 on the thumb screw 121 is actuated to adjust the tension on spring 122 and the adjusting wheel 114 is manipulated to turn the pin 112, and therefore its threaded portion 115, until the reference markers 129 and 130 are lined up to indicate that the lever mechanism has been adjusted to a zero position and the reading on the gage 119 is zero. When these adjustments are completed the lock nut 120 is turned to lock the pin 112 in its adjusted position relative to the hydraulic cell 116 and thereby initially to fix the effective length of the pin 112.

If it is desired to conduct the tests with a liquid lubricant between test pieces, a lubricant reservoir 131 is mounted in a retaining ring 132 which in turn is made fast to the forward end of the tube 14 and adjacent the face of the casing 11 as shown in FIGURES 4 and 6. The rear wall 134 of the reservoir is cut out to fit around the enlarged portion 136 of the shaft 10 and against an O-ring 137 and the lubricant seal 15 so as to avoid spilling of lubricant from between the rear wall 134 and the front of the casing 11.

It will be apparent from this description that a most accurate record of the frictional force exerted by a rotating test ring on a test block will be recorded on the gage 119 during operation of the machine. A test block 49, holder 44 and load transfer member 41, or a test block 49a and member 41a, assembled with a retaining member 39 and side piece 50 can readily be inserted in place as an assembly while slightly raising upper lever member 56. After initial adjustment involving pin 112, lock nut 120 and thumb screw 121 in the manner described, a load is applied by placing the weights 87 on the bale rod 82 and the test run is begun by turning on the motor 21 to rotate the shaft 10 in counterclockwise direction as illustrated in FIGURES 2 and 3. Slight movement towards the left by the test block 49 and the test block holding assembly 39, 41, 44 and 50 will tend to move the upper lever member 56 slightly to the left and to rotate the aforesaid assembly slightly counterclockwise around the axis of the shaft 10 and thereby transmit the frictional force to the pin 112 for recording on the gage 119. In order to compensate for the slight motion out of zero position, the adjusting wheel 114 is then actuated to increase the effective length of the pin 112 until the test block 49 is returned to its initial zero position, as indicated by coincidence of the reference markers 129 and 130.

If desired, the gage 119 may be preset to shut the motor off automatically when a preselected magnitude of frictional force is indicated. It is also feasible to insert the lead of a thermocouple wire into a test block 49 at a location closely adjacent its line of contact with a test ring 30 and thereby to record temperature closely adjacent the contacting bearing surfaces. The number of revolutions of the test ring 30 are recorded on the counter 26 and any tendency for the lever system to vibrate is minimized by the operation of damper mechanism 99—107. Knowing the speed of rotation of the shaft 10, which may be made variable if desired, it is possible accurately to determine the friction between the periphery of the test ring 30 and of a test block 49 as it is affected by the lubricant employed, the load imposed, the speed of rotation and to correlate this data with the number of revolutions before cut-off and the temperature generated in the test block. Because of the unique flex point construction of the lever system, inaccuracies which may ordinarily seem minor but are of major consequence in accurate tests, e.g., inaccuracies due to the necessity of overcoming the frictional resistance of bearing surfaces and the like, are substantially eliminated.

It is to be expected that numerous modifications will readily become apparent to those skilled in the art upon reading this description. All such modifications are intended to be included within the scope of the invention as defined in the appended claims.

We claim:

1. A machine for testing a lubricant between two test specimens which comprises means for rotating, on its axis of rotation, a first test specimen having a cylindrical test surface; means for holding a second test specimen against the test surface of the first test specimen for substantial line contact therewith, said holding means being mounted for limited rotation of said second test specimen about said given axis and having curved seating means with a center of curvature at said line of contact; means for applying a preselected load on the second test specimen to exert pressure against the first; and means for measuring the frictional force between the specimens upon rotation of the first test specimen.

2. A machine for testing a lubricant between two test specimens which comprises means for rotating, on its axis of rotation, a first test specimen having a cylindrical test surface; means for holding a second test specimen against the test surface of the first test specimen for substantial line contact therewith, said holding means being mounted for limited rotation of said second test specimen about said given axis and having cylindrical seating means with a center line of curvature at said line of contact and tangential to the cylindrical surface of the first test specimen; means for applying a preselected load on the second test specimen to exert pressure against the first; and means for measuring the frictional force between the specimens upon rotation of the first test specimen.

3. A machine for testing a lubricant between two test specimens which comprises means for rotating a first test specimen about a given axis of rotation; means for holding a second test specimen against the first test specimen in a given zero position, said holding means being mounted for limited rotation about said given axis; means for applying a preselected load on one of said test specimens to exert pressure against the other; and means for returning the second specimen and holding means to said given zero position and measuring the frictional force between the specimens upon rotation of the first test specimen while said second specimen is held in said zero position.

4. A machine for testing a lubricant between two test specimens which comprises means for rotating a first specimen having a cylindrical test surface on an axis of rotation coincident with the center of curvature of said surface; means for holding a second specimen having a substantially plane test surface against the cylindrical test surface of the first specimen in a given zero position for substantial line contact therewith, said holding means being mounted for limited displacement of said second specimen about said axis of rotation and being provided with curved seating means having a center of curvature at said line of contact, whereby the second specimen is adapted to maintain itself in alignment with the first; means for applying a preselected load on the second specimen in a direction perpendicular to and through said line of contact and said axis of rotation; and means for returning the second specimen and holding means to said given zero position and measuring the frictional force between the specimens upon rotation of the first specimen.

5. A machine for testing a lubricant between two test specimens which comprises means for rotating a first specimen having a cylindrical test surface on an axis of rotation coincident with the center of curvature of said surface; means for holding a second specimen having a substantially plane test surface against the cylindrical test surface of the first specimen in a given zero position for substantial line contact therewith, said holding means being mounted for limited displacement of said second specimen about said axis of rotation and being provided with cylindrical seating means having a center line of curvature perpendicular to and through said line of contact and tangential to the cylindrical test surface, whereby the second specimen is adapted to maintain itself in line contact with the first; means for applying a preselected load on the second specimen in a direction perpendicular to and through said line of contact and said axis of rotation; and means for returning the second specimen and holding means to said given zero position and measuring the frictional force between the specimens upon rotation of the first specimen.

6. In a lubricant testing machine having a rotatable shaft for receiving a test ring and means for holding a test block in contact with the peripheral surface of a test ring, the improvement which comprises means for maintaining a load on the test block in a direction perpendicular to the axis of rotation of the shaft and coincident with a plane through said axis and the line of contact between the test pieces, a longitudinal member of adjustable length between the test block holding means and a force-measuring means, and means in a plane tangential to the test ring at the line of contact between the test pieces for measuring said frictional force directly.

7. In a lubricant testing machine having a rotatable shaft for receiving a test ring, means for holding a test block in contact with the peripheral surface of a test ring in a given zero deflection position, a lever system for applying a load to a test block through said test block holding means, and means for measuring frictional force applied to a test block by rotation of a test ring in contact therewith, the improvement which comprises a longitudinal member of adjustable length between the test block holding means and force-measuring means for transmitting a force from the block to the measuring means and restoring the block to the zero position after commencement of a test run, and vibration damping means on the lever system for minimizing oscillatory movements thereof.

References Cited in the file of this patent

UNITED STATES PATENTS

| | | |
|---|---|---|
| 98,043 | Emerson | Dec. 21, 1869 |
| 1,534,014 | Gillett | Apr. 14, 1925 |
| 1,777,423 | Zeder | Oct. 7, 1930 |
| 1,990,771 | Boden | Feb. 12, 1935 |
| 1,995,832 | Boden | Mar. 26, 1935 |
| 2,279,159 | Camp | Apr. 7, 1942 |
| 2,793,851 | Ruge | May 28, 1957 |
| 2,867,113 | Mims | Jan. 6, 1959 |
| 2,944,417 | Stupp | July 12, 1960 |

FOREIGN PATENTS

| | | |
|---|---|---|
| 2,707 | Great Britain | Feb. 21, 1888 |